Oct. 14, 1952 W. G. NOLCKEN 2,613,505
CONTROL VALVE, SUCH AS FOR REFRIGERATING SYSTEMS
Filed May 26, 1949 4 Sheets-Sheet 1

Inventor
WOLDEMAR GEORGE NOLCKEN
By Maurice A. Crews
Attorney

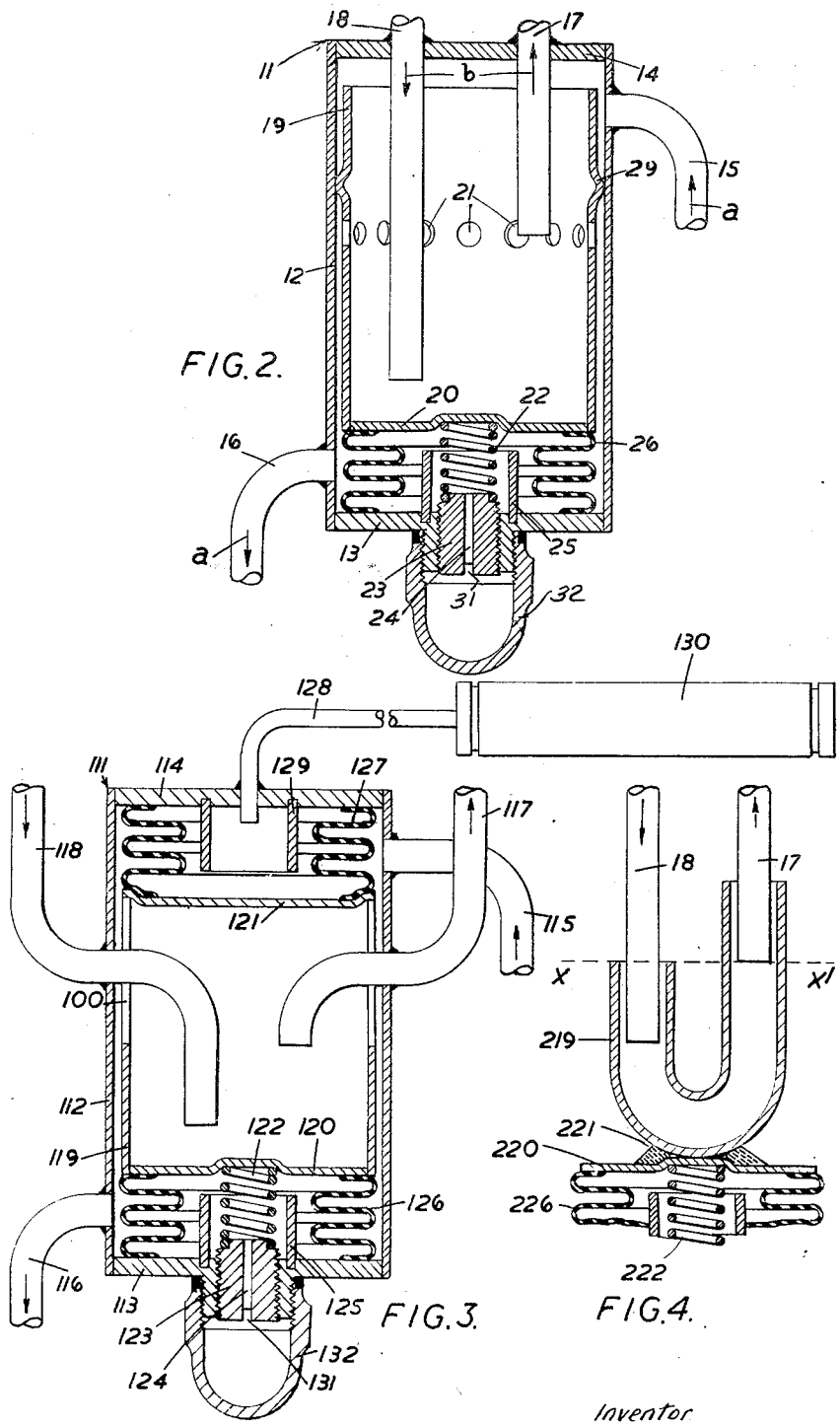

Inventor
WOLDEMAR GEORGE NOLCKEN
By Maurice A. Crews
Attorney

Patented Oct. 14, 1952

2,613,505

UNITED STATES PATENT OFFICE 2,613,505

CONTROL VALVE, SUCH AS FOR REFRIGERATING SYSTEMS

Woldemar George Nolcken, Headington, Oxford, England, assignor to Pressed Steel Company Limited, Oxford, England, a British company Application May 26, 1949, Serial No. 95,497
In Great Britain February 25, 1949

11 Claims. (Cl. 62—2)

1

The present invention relates to a pressure-responsive control valve or metering device and concerns particularly means for controlling the flow of fluids to maintain a predetermined set of physical conditions, such as temperature, pressure, composition of the fluids and the like.

The invention is applicable, for example, to the control of heating systems, refrigerating systems, distillation systems and humidity control systems.

The preferred application of the invention is to refrigerating systems and particularly systems of the secondary condenser-evaporator type, such as is disclosed in the inventor's copending application Refrigerating System With Downwardly Evaporating Secondary Circuit, Serial No. 79,481, filed March 3, 1949.

Secondary systems are well-known and much used, and means for automatically controlling their operation are well-known.

More particularly, in domestic cabinets of the multiple temperature type, it is usual to refrigerate the main food storage compartment by means of a secondary evaporator secured to the metallic liner of said compartment, while the secondary condenser is in contact with a primary source of cold which also refrigerates the low temperature compartment of the cabinet.

In this way some of the cold generated in a primary evaporator at a low temperature level is used to cool a second storage space at a higher temperature level, and in order to control and keep constant the temperature in said second storage space against a variable heat load, it is customary to insert controlling means in the secondary system.

Such means may be responsive to the pressure in the secondary system where the control is said to be of the constant pressure type or, alternatively, responsive to the temperature in the food storage compartment where it is said to be of the thermostatic type. Essentially they consist of an elastic pressure responsive element such as a flexible diaphragm or Sylphon bellows which operate a needle valve fixed in the liquid outlet pipe or in the vapour inlet pipe of the secondary condenser, so disposed that the necessary amount of condensate is released into the secondary evaporator according to demand.

Experience has shown that whereas complete control of the secondary pressure or temperature can be achieved by these means, the mechanical means for metering condenser liquid, such as needle valves or the like, are somewhat delicate

2 in operation, liable to stick or leak and thereby to cause a breakdown of the control.

In order to overcome drawbacks of this kind there is provided, in accordance with the invention, a control valve or metering device actuated by hydraulic means operated by known temperature or pressure control means.

Both constant pressure type and thermostatic type valves operate with the hydraulic means according to the invention, but it must be understood that the invention is not limited to these two types of valves.

The invention will now be described in detail, reference being had to the accompanying drawings, of which:

Figure 1, illustrating the preferred form of the invention, is a perspective view, with parts broken away, of a domestic refrigerator;

Figure 2 shows, somewhat diagrammatically and to a greatly enlarged scale, a control valve actuated by a constant pressure type power element;

Figure 3 shows a control valve actuated by a thermostatic type power element;

Figure 4 shows a modification of the control valve of Figure 1;

Figure 1:
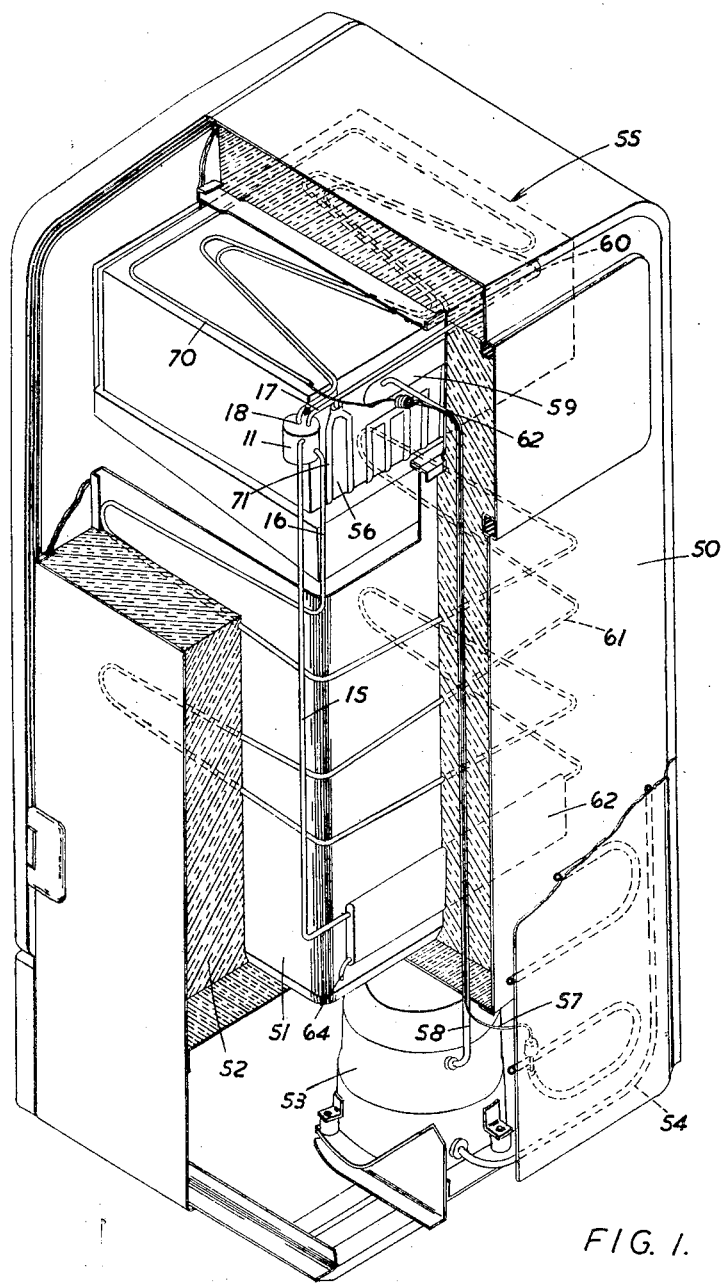

In Figure 1 is shown a domestic refrigerator comprising the outer casing 50 and inner liner 51 (defining the food storage space), separated by the insulation 52. This refrigerator is of the vapour compression type co-acting with a secondary condenser-evaporator type. A hermetically sealed motor-compressor unit 53 is mounted at the bottom of the cabinet and compressed refrigerant vapour therefrom passes to the primary condenser 54 in the form of a serpentine coil secured to the back of the cabinet, whence the condensed liquid refrigerant passes through the capillary tube 57 disposed in heat-exchange relationship with the vapour return pipe 58. The capillary tube is coiled at 62 before connection to the primary evaporator 55, shown as consisting of the coil 70 disposed in serpentine form and terminating in the passages 71 of the evaporator box 56. Arranged in heat-exchange relationship with the primary evaporator coil 70 is the secondary condenser coil 60 having the vapour inlet pipe 17 and the liquid outlet pipe 18 thereto terminating in the control valve 11, as will hereinafter appear. The secondary evaporator 61, with the vapour inlet pipe 15 and liquid outlet pipe 16 thereto similarly terminating in the control valve 11, is arranged as a continuous coil surrounding the liner 51. The vapour return pipe 15 is arranged to be straight and vertical and is connected with the coil 61 through the horizontal vessel 62, which is also in heat-exchange relationship with the liner 51. This vessel is large enough to act as a liquid/vapour separator and any liquid which passes unevaporated through the secondary evaporator coil 61 will remain in the vessel 62, there to be evaporated, while the vapour passes directly to the pipe 15 and so through the control valve 11 back to the condenser 60.

The whole secondary system is hermetically sealed after having been evacuated of air and charged through the pipe 64 with a predetermined quantity of condensible vapour to act as secondary refrigerant.

One form of the control valve 11 of Figure 1 is shown in detail in Figure 2, in which the valve 11 consists of a cylindrical container 12 closed by end plates 13 and 14. The vapour and liquid pipes 15 and 16 respectively connect with the secondary evaporator 61 of Figure 1 and are in open gas communication within the housing. The point at which pipe 15 enters the valve housing must be at a higher level than the point of entry of the pipe 16. The arrows a show the circulation of the refrigerant through the valve from the secondary evaporator.

The pipes 17 and 18 from the secondary condenser 60 of Figure 1 pass through the end plate 14 of the valve housing and depend thereinto to a predetermined depth, the pipe 17 being the shorter of the two and through it vapour enters the secondary condenser, whereas liquid condensate flows into the valve via the pipe 18, as indicated by the arrows b and as will be explained later.

A cylindrical vessel 19 in the shape of a cup open at the top and closed at the bottom, as at 20, and formed with the series of holes 21 all arranged at the same horizontal level, ordinarily substantially level with the outlet of pipe 17, rests upon, and is supported by, the spring 22 which, in turn, is supported by the screw cap 23 screwed into the end plate 13 and having the bore 24 terminating in a slot 31 to receive, e. g. a screw-driver for adjustment, the whole being enclosed by the cover nut 32. The cup 19 is prevented from tilting in the housing by the circumferentially distributed dimples 29. The pipes 17 and 18 project into the vessel 19 to a predetermined depth.

A flexible bellows 26 is soldered to the end plate 13 and to the bottom 20 of the vessel 19 forming a gas-tight partition between the space inside the valve body 11, which is in open gas communication with the four pipes 15, 16, 17 and 18, and the space encompassed by the bellows 26, and the end plate 13 and the bottom wall 20, which space is in open gas communication with atmosphere via the breather hole 24 drilled through the screw plug 23. If the cover nut 32 is tightly fitted, it is more correct to say that the arrangement operates with a volume of air originally trapped at atmospheric pressure.

The bellows 26 can contract and expand between the limits provided on the one side by the engagement of the bottom wall 20 with the upper surface of a cylinder 25, fixed in the end plate 13 and on the other side by the engagement of the open top of the vessel 19 with the end plate 14.

The depth to which pipe 18 projects into the vessel 19 is not such as to interfere at any time with the free movement of the bellows 26 by colliding with the bottom wall 20 before the top of the vessel 19 has come into contact with the cover plate 14.

The operation is as follows:

The secondary condenser 60, being in contact with the primary source of cold, the primary evaporator 70, is the coldest part of the system, wherefore liquid accumulates therein by condensation of vapour coming from other parts of the system. The vapour enters by way of the open pipe 17 and liquid descends by gravity in pipe 18, the whole of the secondary condenser operating in the manner of a syphon. In this way the vessel 19 is filled with liquid which ultimately overflows into the housing 11 and drains away through pipe 16.

Figure 8:
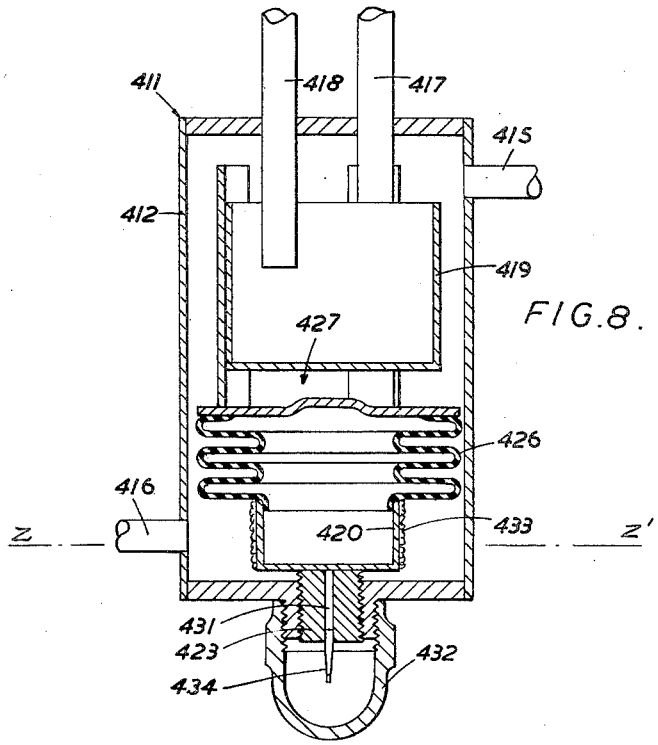

In Figure 2 this overflow of liquid from the vessel 19 takes place through the holes 21, whereas in Figure 8 the liquid flows over the edge of the corresponding vessel 419. It will be understood that this difference is quite immaterial to the operation of the valve.

The overflowing liquid descends by gravity into the secondary evaporator 61 wherein it vaporises and the vapour, together with such liquid as has not been vaporised, enters the vessel 62 in which the liquid remains while the vapour passes through pipe 15 back into the valve 11 and hence, by way of pipe 17, into the secondary condenser 60.

In this way heat is transferred from evaporator 61 and vessel 62 to the condenser 60 in the well-known manner of secondary condenser-evaporator systems.

The pressure throughout the system is the same, except for minor differences due to the hydraulic heads of liquid columns in various parts of the system, which small differences can be ignored.

This pressure also prevails inside the body of the valve 11, above the bellows 26, whereas below the bellows the pressure is atmospheric. The loading of the spring 22 (see Figure 2) may be set by means of the screw 23 so that the secondary pressure tending to compress the bellows is just balanced by the spring and atmosphere tending to expand them. As long as the secondary pressure remains constant the vessel 19, which is supported by the spring 22 and bellows 26, does not move. Progressively, however, due to the general reduction in temperature resulting from the secondary system operation, the pressure falls and, therefore, the vessel 19 rises. When it has risen to the point where the meniscus of liquid in it makes contact with the outlet at pipe 17, no more vapour can enter through this pipe and the syphon action through condenser 60 is interrupted. The condenser 60 now completely fills up with liquid and all circulation stops. No liquid is added to that contained in the vessel 19 and none overflows and descends through evaporator 61. Refrigeration by means of the secondary circulation being suspended, the temperature of the evaporative parts of the system begins to rise. Residual liquid trapped in the vessel 62 evaporates causing the pressure throughout the system to rise, resulting in compression of the bellows 26 and a lowering of the vessel 19 to a lower level until the liquid contact between the pipe 17 and the liquid surface in the vessel 19 is broken, whereupon the syphon action through the condenser 60 is restored.

It will be understood that since the variable secondary pressure in the valve 11 is opposed by a constant atmospheric pressure assisted by a constant spring load, there is within the working range of the bellows a strict correspondence between the secondary pressure and the position of the vessel 19; high secondary pressures corresponding to low positions of said vessel and vice versa. It also will be understood that since the liquid level in the vessel 19 cannot rise above or fall below the level of the overflow holes 21 (Figure 2), the valve as a whole must operate in the manner of constant pressure valves, i. e. the secondary pressure is kept constant within close limits at all times and at a figure predetermined by the position of the screw-plug 23 which adjusts the tension of the spring 22.

It should be understood that the control valve 11, although particularly adaptable for use with a system such as that described in the inventor's co-pending application No. 79,481, "Refrigerating Systems," filed March 3, 1949, would operate equally well with any other of the known types of secondary condenser-evaporator systems.

The charge of secondary refrigerant must be sufficient to leave some liquid over in the evaporator side after the condenser has been completely filled with liquid when the valve closes, and not so large as to obstruct the free passage of vapour through the vessel 62 and into pipe 15. Within these limits the charge may vary widely, without affecting the operation.

Referring now to Figure 3, this shows in section the same type of valve mechanism comprising a hydraulic lock for the condenser syphon, but adapted for thermostatic control as opposed to constant pressure control, as in Figures 1 and 2.

The valve housing 111 is in the form of a cylindrical container 112 enclosed by end plates 113 and 114.

The pipes 115, 116 and 117, 118 correspond with the pipes 15, 16 and 17, 18 of Figure 2 but in this case the secondary condenser pipes 117 and 118 pass through the walls of the cylindrical container 112, the pipe 117 being the shorter of the two and through it vapour enters the condenser, while liquid returns through pipe 118.

A cylindrical vessel 119, open at the top, is formed with two wide axial slots 100 extending approximately from the lower level of the pipe 117 to the top of the cylinder 112 and through which pass the pipes 117 and 118.

The end plate 120, as before, rests upon, and is supported by, the spring 122 which, in turn, is supported by the screw-plug 123 formed with a breathing hole 124 and slot 131, whilst a flexible bellows 126 is soldered to the bottom wall 120 of the vessel 119 and the end plate 113 forming a gas-tight partition between the space inside the valve body 111 which is at secondary evaporation pressure and the space encompassed by the bellows 126, the end plate 113 and the bottom wall 120, which is at atmospheric pressure. As before, the plug 123 is fitted with a cover nut 132.

The essential difference from the arrangement of Figure 2 is the provision of the additional bellows 127 (of the same size and diameter as the bellows 126) which is soldered to the plate 121 normally resting on the vessel 119 and the end plate 114 encompassing a gas-tight space which is in open gas communication with a thermostatic bulb 130 through the capillary tube 128 which passes through the end plate 114.

The pair of bellows 126 and 127 are free to contract and expand between the limits imposed by the two stops provided respectively by the cylinder 125, against which the bottom wall 120 abuts, and the cylinder 129, against which the plate 121 abuts.

The thermostatic bulb or phial 130 connected to the capillary pipe 128 is located inside the food-storage chamber in a position to represent the temperature in that chamber. In known manner, this phial is charged with a volatile fluid, the vapour pressure of which is a measure of its temperature. This phial, together with the tube 128 and the chamber encompassed by the bellows 127, the end plate 114 and the plate 121, forms a self-contained hermetically sealed thermostatic power element, as is well-known and much used.

The element should be liquid charged (as opposed to gas charging) to prevent breakdown due to the charge having distilled over from the phial into the bellows chamber. Liquid charging means that the quantity of the condensible fluid is such that the whole charge is liquid with the exception of a small vapour volume; gas charging, on the other hand, means that the quantity of the condensible fluid is such that the whole charge is in a vapour state above a certain temperature, with liquid beginning to form below that temperature. Alternatively, a dry absorbent or adsorbent medium may be used in the phial. For example, the phial could be charged with adsorbent charcoal powder and the gas space with $CO_2$ gas, as is well known.

The operation of the thermostatic valve shown in Figure 3 is essentially the same as that of the valve shown in Figure 2, but the valve responds to changes in temperature of the thermostatic phial instead of changes in secondary pressure.

The secondary pressure acts upon the two equal areas of bellows 126 and 127 arranged in opposition, the two effects cancelling out so that no movement of the vessel 119 takes place in response to changes in secondary pressure.

The pressure within the bellows 127 corresponds to the temperature of the phial, and this pressure is opposed by the constant pressure of the atmosphere in the bellows 126, together with the pressure of the spring 122, pre-set to a predetermined value by means of the screw-plug 123.

Accordingly, the position of the vessel 119 within the housing 111 and with reference to the pipes 117 and 118 corresponds to the temperature of the thermostatic phial and, in fact, is a measure of this temperature, high temperature corresponding to low positions of the vessel 119 and vice versa.

The liquid level in the vessel 119 is kept constant at the lower level of the slots 100, which act as overflow weirs in the same way as do the holes 21 of Figure 2. The opening of pipe 117 is closed and syphoning through the condenser stops at a predetermined phial temperature at which the liquid level in the vessel 119 blanks off the opening of pipe 117.

The valve of Figure 3, has been described as providing thermostatic control, with the bellows 126 and 127 of the same size and diameter, but it should be understood that if the effective area of the bellows 127 be reduced, as compared with the bellows 126, then the valve could be made to function as a pressure control, in substantially the same way as the valve of Figure 2, but avoiding the inevitable slight variations of cabinet temperature which take place, with that valve, in response to large variations in ambient temperature. This is achieved by disposing the phial 130 in a position to be responsive to the ambient temperature, i. e. adjacent the external wall of the cabinet, whereby these variations are compensated for in a well-known manner, and the cabinet temperature remains constant for all ambient temperatures.

Figure 4 is a modification of one part of the valve. It may be observed that in valves according to Figure 2 vibration or shaking is liable temporarily to interfere with accurate control of the secondary pressure. Thus, for example, slamming of the door of a domestic cabinet controlled by this valve would shake out some of the liquid contained in the sealing vessel 19, spilling it into the housing 11 and hence into the evaporator pipe 16. The liquid lost from the vessel 19 would be replaced from the condenser causing an extra amount of refrigeration to be done in the system when not required. This drawback equally applies to the valve arrangement according to Figure 3.

In order to overcome, as much as possible, the undesirable effects of shaking, it is essential that the liquid capacity of the vessel 19 should be small, so as to keep the amount split over within negligible limits.

Figure 4 illustrates the sealing vessel 19 of Figure 2 modified to meet this condition. The pipes 17 and 18 correspond with those of Figure 2, but in this case, the vessel 19 is replaced by a U-shaped tube 219 with limbs of unequal length. The U-tube 219 is secured, as at 221, to the bellows cover 220 which rests on the spring 222 and is attached to the bellows 226 in a manner similar to the arrangement of Figure 2, all other parts of the valve being as in Figure 2. The U-tube 219 fits loosely over the two pipes 17 and 18 and is free to move up and down along them in response to secondary pressure variations. The liquid level in both limbs is equal and is at the height of the edge of the shorter limb, whence it overflows into the valve housing, as indicated by the line $x$—$x_1$ in Figure 4.

It will be understood that, whereas the U-tube 219 controls the secondary condenser in precisely the same way as does the vessel 19 in Figure 2, the amount of liquid which can be shaken out of it is very small and consists of the liquid contained in the upper portion of the short limb, i. e. within the annular space formed by pipe 18 inside the somewhat wider limb of the tube 219.

The same modification is applicable to valves according to Figure 3, as will be readily understood.

Figure 5:
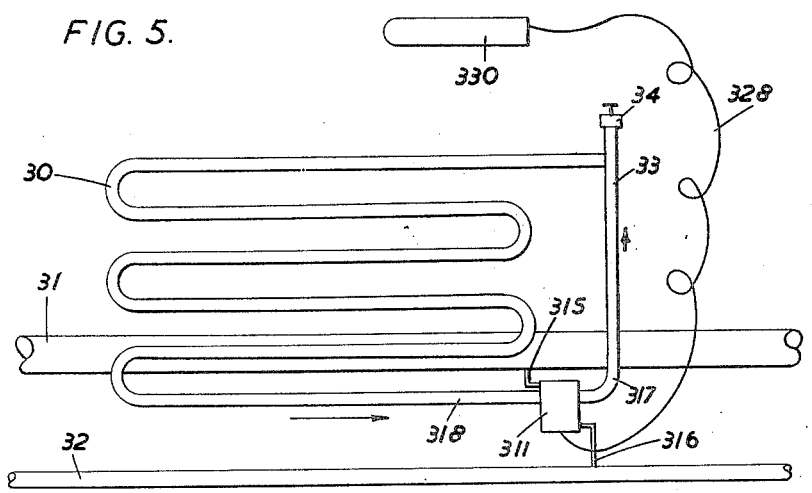
Figures 5 and 6 illustrate diagrammatically the application of the invention to a steam heating system and the control valve therefor which, in this case, is inverted, as compared with the arrangement of Figure 1.

In Figure 5 is illustrated diagrammatically the application of the invention to a steam heating system, wherein a plurality of radiators, such as 30, are coupled between a steam manifold 31 and a return water manifold 32.

Figure 6:
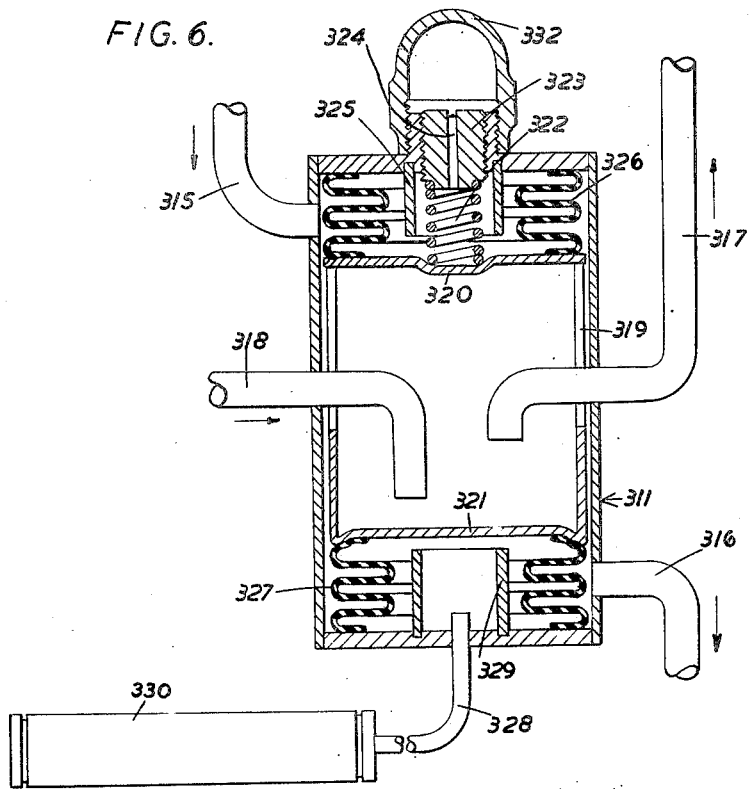

The control valve 311 is connected between the manifolds 31 and 32 inverted with respect to the arrangement of Figure 3, as shown clearly in Figure 6.

The steam inlet pipe 317 and water outlet pipe 318 to and from the radiator 30, project into the cup 319 floating within the valve 311, whilst the steam inlet pipe 315 and water outlet pipe 316 come into the valve housing at upper and lower levels respectively. The lower cover plate 321 of the cup 319 is supported by the bellows 327, the movement of the bellows being limited by the stop member 329, whilst the capillary tube 328 connects with a thermostatic phial 330 disposed suitably within the space to be heated. The plate 320 rests upon the vessel 319 and is secured to the bellows 326 assisted by the spring 322 and adjustable by the screwed plug 323 formed with a breather hole 324, and enclosed by the cover nut 332.

The action is as follows:

Normally the radiator 30 will be full of water, whilst the thermostatic pressure is high, the inlet 317 being sealed. When, however, the temperature falls, the thermostatic pressure similarly falls and the cup 319 will descend and break the seal. A gas lift circulation then takes place through the vertical stand pipe 33 extending from the inlet pipe 317 (and terminating in the usual air vent valve 34) around the coils of the radiator and back to the valve housing via the pipe 318. The water circulates at a speed and temperature depending upon the amount of steam condensed in the radiator, which, in turn, is dependent on the position of the cup in the housing and this, in turn, is dependent on the temperature of the phial 330, and thus a constant temperature is maintained, which temperature is adjustable as desired by adjustment of the plug 323.

It is known to de-aerate refrigerants or condensible vapours by means of a branch circuit, in which vapour condensation takes place on the surface of a very small evaporator kept at a very low temperature by independent means. Such vessels act as collectors for air or other non-condensible gases and means for keeping the non-condensible gases trapped in the collector vessel are known, as well as means for automatically venting to waste the trapped gases whenever a sufficient amount has accumulated.

In arrangements of this type, condensation in the rectifier vessel goes on all the time, regardless of whether there are any inert gases to be separated or not, and accordingly the heat load to the refrigerating plant which supplies the cold for the rectifier is constantly high.

Figure 7:
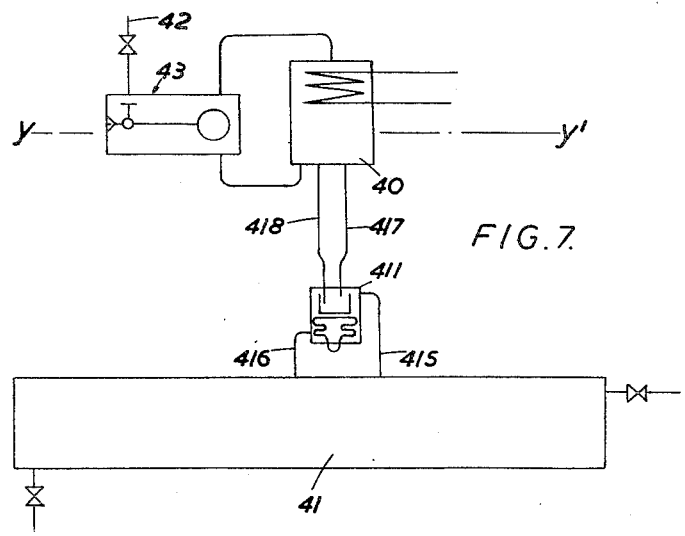
Figures 7 and 8 illustrate diagrammatically a vapour rectification system and the valve therefor respectively.

In the arrangement, according to the invention as shown in Figures 7 and 8, the rectifier vessel 40 is normally filled with a stagnant body of liquid refrigerant and the heat load to the refrigerator is low, since no condensation takes place. When, however, the refrigerant in the main container 41 is contaminated with non-condensible gases, these cause the control valve 411 to open, admitting into the rectifier vessel 40 a mixture of vapour and non-condensible gases, which in known manner, is rectified. The liquid condensate returns to the main container, via the pipe 418, and the non-condensible gases accumulate in the rectifier and are automatically released to waste 42 through a float valve, indicated at 43, in known manner. When all the non-condensible gases (up to a predetermined concentration) have been removed from the main refrigerant storage chamber, the control valve closes again preventing further condensation from taking place in the rectifier vessel.

The valve 411 comprises the flexible bellows 426 connected to a container 420 forming a hermetically tight system, charged with the same fluid as in the main storage vessel 41, through the hole 431 in the adjusting screw 423 and sealed off by a plug 434 and enclosed by the cap 432. The liquid level inside the bellows element is approximately along the line $x$—$x_1$. The bellows is surmounted by the cup 419 with the two pipes 417 and 418 of unequal length projecting into it. In order to reduce heat conduction between bellows housing and the cup, a space between them, as indicated at 427, is provided. The exact height of the bellows and cup within the valve housing 412 is adjusted by means of the screwed plug 423.

The container 420 beneath the bellows is preferably covered on the outside with material 433 of high capillarity such as a lampwick. The liquid level in the valve housing 412 is also kept at the level $z$—$z^1$, by the liquid return pipe 416 to the main storage vessel 41, keeping the lampwick wetted at all times. The wetted outer surface of the container 420 records the wet bulb temperature of the refrigerant in the system and this, in turn, determines the vapour pressure within the bellows element, the whole operating in the manner of a wet-bulb vapour pressure thermometer.

It will be understood that since the refrigerant within and without the bellows space is the same, the vapour pressure within and without will be equal at all temperatures. When, however, the vapour in the system is contaminated with non-condensible gases, the partial pressure of these is added to the vapour pressure of the refrigerant and the total pressure exceeds the saturated vapour pressure within the bellows, which accordingly contract and open the circulation through the rectifier.

When all the non-condensible gases are in the rectifier, the bellows 426 expands again to stop the syphon action through the rectifier.

The inert gases in the rectifier 40 depress the liquid level therein as well as in the float valve chamber 43, and when this reaches the level $y$—$y^1$, the float valve will open and release to waste 42 the surplus volume of non-condensible gases.

It will be understood that the float valve 43 could be incorporated inside the rectifier vessel 40, and the valve 411 inside the main storage vessel 41, thereby eliminating the necessity for separate housings and pipe connections.

The main storage vessel may be a condenser or liquid receiver of a refrigerating machine, or a container used for charging instruments or apparatus with pure fluids having constant vapour-pressure characteristics.

The impurities referred to as "non-condensible gases" could be condensible vapours of higher vapour pressure than that enclosed in the bellows and these could be collected, condensed and rectified in like manner in an apparatus connected to the waste discharge pipe from the float valve, said second apparatus operating at a lower temperature and with a suitable fluid in the bellows element. In the same way a third and fourth or fifth set of rectifying sets can be added, depending on the number of fractions it is desired to collect from the distillate.

I claim:

1. A control valve for controlling the flow of fluids between interconnected fluid circulatory systems, comprising a housing, inlet and outlet pipes connecting said housing with one circulatory system, an open vessel within said housing, means for floatingly supporting said vessel and for vertically moving it up and down in response to conditions desired to be controlled by the flow of fluid in the system, inlet and outlet pipes depending within said vessel to different depths and connecting said vessel with the other circulatory system so that upward movement of said vessel will close and downward movement thereof will open the pipe projecting to the smaller depth.

2. A control valve for controlling the flow of fluids between interconnected fluid circulatory systems, comprising a housing, inlet and outlet pipes connecting said housing with one circulatory system, an open floating vessel within said housing, said floating vessel being supported by an adjustable pressure-responsive device, inlet and outlet pipes depending within said vessel to different depths and connecting said vessel with the other circulatory system.

3. A control valve for controlling the flow of fluids between interconnected fluid circulatory systems, comprising a housing, inlet and outlet pipes connecting said housing with one circulatory system, an open floating vessel within said housing, said floating vessel being supported by an adjustable pressure-responsive device comprising an expansible bellows, a spring and an adjusting screw, inlet and outlet pipes depending within said vessel to different depths and connecting said vessel with the other circulatory system.

4. A control valve for controlling the flow of fluids between interconnected fluid circulatory systems, comprising a housing, inlet and outlet pipes connecting said housing with one circulatory system, an open floating vessel within said housing, said floating vessel being supported by an adjustable pressure-responsive device, comprising an expansible bellows, a spring and an adjusting screw, limit stops for said expansible bellows, inlet and outlet pipes depending within said vessel to different depths and connecting said vessel with the other circulatory system.

5. A control valve for controlling the flow of fluids between interconnected fluid circulatory systems, comprising a housing, inlet and outlet pipes connecting said housing with one circulatory system, an open floating vessel within said housing, liquid level control means in said vessel, said floating vessel being supported by an adjustable pressure-responsive device comprising an expansible bellows, a spring and an adjusting screw, limit stops for said expansible bellows, inlet and outlet pipes depending within said vessel to different depths and connecting said vessel with the other circulatory system.

6. A control valve for controlling the flow of fluids between interconnected fluid circulatory systems, comprising a housing, inlet and outlet pipes connecting said housing with one circulatory system, an open vessel disposed within said housing, opposed elastic supports for said vessel, inlet and outlet pipes depending within said vessel to different depths and connecting said vessel with the other circulatory system.

7. A control valve for controlling the flow of fluids between interconnected fluid circulatory systems, comprising a housing, inlet and outlet pipes connecting said housing with one circulatory system, an open vessel disposed within said housing, opposed elastic supports for said vessel comprising a pressure-responsive device and a temperature-responsive device, means for adjusting said devices, inlet and outlet pipes depending within said vessel to different depths and connecting said vessel with the other circulatory system.

8. In a refrigerating system, a secondary condenser and evaporator, a shut off valve disposed between the secondary condenser and the secondary evaporator, said control valve comprising a housing, an open vessel within said housing, means for floatingly supporting said vessel and for moving it up and down in response to conditions desired to be controlled by the flow of fluid in the system, inlet and outlet pipes to and from the secondary evaporator connected with said housing and inlet and outlet pipes to and from the secondary condenser depending within said vessel, the end of the condenser outlet pipe being arranged at a lower level than the end of the condenser inlet pipe.

9. In a secondary refrigerating system, a control valve comprising a housing, a floating open vessel within said housing supported by an adjustable pressure-responsive device, said vessel being in the form of a U-tube, inlet and outlet pipes to and from an evaporator of the system connected with said housing and inlet and outlet pipes to and from a condenser of the system depending within said vessel, the end of the condenser outlet pipe being arranged at a lower level than the end of the condenser inlet pipe.

10. Valve for controlling the flow of a gaseous condensable medium, comprising a closed housing communicating with a conduit for said medium, a vessel in said housing adapted for supporting a condensate of said medium up to a predetermined level, said conduit having its open end facing downwardly and arranged above the bottom of said vessel, and automatically operated means for moving said vessel up and down in said housing so that liquid condensate in the vessel seals and unseals respectively said open end.

11. Valve for a secondary refrigrating system, comprising a closed housing provided with inlet and outlet for connection with a secondary evaporator and with inlet and outlet for connection with a secondary condenser, a movable liquid receptacle within said housing, said condenser inlet and outlet comprising a conduit open above the bottom of said receptacle and means for moving up and down said receptacle.

WOLDEMAR GEORGE NOLCKEN.

REFERENCES CITED

The following references are of record in the file of this patent:

UNITED STATES PATENTS

| Number | Name | Date |
| --- | --- | --- |
| 1,976,079 | Mallinckrodt | Oct. 9, 1934 |
| 2,433,187 | Alsing | Dec. 23, 1947 |